March 24, 1964 L. G. MacKENZIE 3,126,162

ACTUATING MECHANISM FOR ENDLESS TAPE CARTRIDGES

Filed Dec. 24, 1958 3 Sheets-Sheet 1

LOUIS G. MACKENZIE,
INVENTOR.

BY [signature]

ATTORNEY.

ACTUATING MECHANISM FOR ENDLESS TAPE CARTRIDGES

INVENTOR.
LOUIS G. MACKENZIE,
BY
ATTORNEY.

ACTUATING MECHANISM FOR ENDLESS TAPE CARTRIDGES

Filed Dec. 24, 1958 3 Sheets-Sheet 3

LOUIS G. MACKENZIE,
INVENTOR.
BY
ATTORNEY.

3,126,162
ACTUATING MECHANISM FOR ENDLESS TAPE CARTRIDGES

Louis G. MacKenzie, 920 N. Inglewood Ave., Inglewood, Calif.

Filed Dec. 24, 1958, Ser. No. 782,836
4 Claims. (Cl. 242—55.19)

My present invention relates to apparatus for supporting and actuating one or more endless tape cartridges. Although my present invention is useful in connection with all types of endless tapes upon which information is stored, it has particular utility at present for supporting and actuating endless magnetic recording tape cartridges.

Endless magnetic recording tapes are useful for recording and selectively playing back all types of recordable information, including but not limited to audio and video program material, music, various sounds and messages, computor information, automation control information, and the like.

For convenience in handling, such endless recording tapes are preferably stored in suitable cartridges, with a section of the tape being fed through a suitable operating zone for recording or playing back the information on the tape, as the case may be.

It will be apparent from the following description and claims, and from the accompanying drawings, that my present invention is not limited to any particular type of endless tape cartridge. However, a cartridge which has been found particularly useful for storing endless tapes is shown and described in detail, and claimed, in my prior United States Letters Patent No. 2,699,332, issued January 11, 1955 for a "Means for Actuating an Endless Tape or the Like." Accordingly, the preferred embodiment of my present invention herein shown and described contains certain details of design that are particularly adapted to accommodate my endless tape cartridge disclosed in my prior Patent No. 2,699,332. It will be apparent that these design details may be suitably modified to accommodate other types of endless tape cartridges without departing from the scope of my present invention.

Heretofore, the uses of such endless tape cartridges have been very limited due to the lack of satisfactory apparatus for properly controlling the storage on and release of information from such tapes, particularly where a plurality of such endless tape cartridges are employed either for selective individual use or for the combined release of information from the plurality of cartridges either concurrently or successively, or both.

Accordingly, it is an object of my present invention to provide apparatus for supporting and actuating an endless tape cartridge in which the tape is selectively operatively engaged with or disengaged from a continuously moving drive means, for selectively moving the tape through a suitable operating zone.

Another object of my present invention is to provide apparatus for supporting and actuating an endless tape cartridge in which the tape is selectively moved into and out of operative mechanical engagement with a continuously moving mechanical drive means, for selectively moving the tape through a suitable operating zone.

Another object of my present invention is to provide apparatus for supporting and actuating an endless tape cartridge in which the cartridge is mounted on a supporting tray that is selectively mechanically movable to move the tape into and out of operative engagement with a continuously moving drive means.

Another object of my present invention is to provide apparatus of the character described in which the endless tape is substantially instantaneously started and stopped by my actuating mechanism, whereby none of the signal recorded on the tape is lost or slurred either during recording or during play-back, and whereby a plurality of endless tape cartridges may be selectively actuated to combine the information therefrom without any apparent interval between the messages on the respective tapes.

Another object of my present invention is to provide, in apparatus of the character described, signal means on the tape and operatively associated sensing means forming a part of the actuating mechanism, for automatically cueing in any operating mechanism, such as mechanism for disengaging the mechanical drive connection with the tape whereby the tape will stop, or actuating another similar tape cartridge, or other operating mechanism.

A further object of my present invention is to provide, in apparatus of the character described, a novel solenoid actuating mechanism for causing the tape to be operatively engaged with or disengaged from the tape drive means, and a novel electrical circuit for operating the solenoid.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specification:

Figure 1:
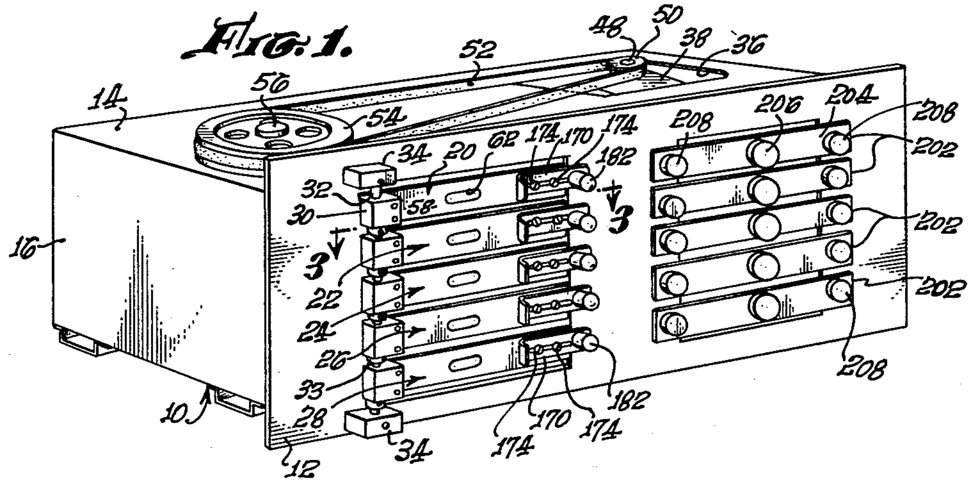
FIGURE 1 is a front perspective view illustrating a presently preferred embodiment of my apparatus for supporting and actuating endless tape cartridges.
Figures 2, 10:
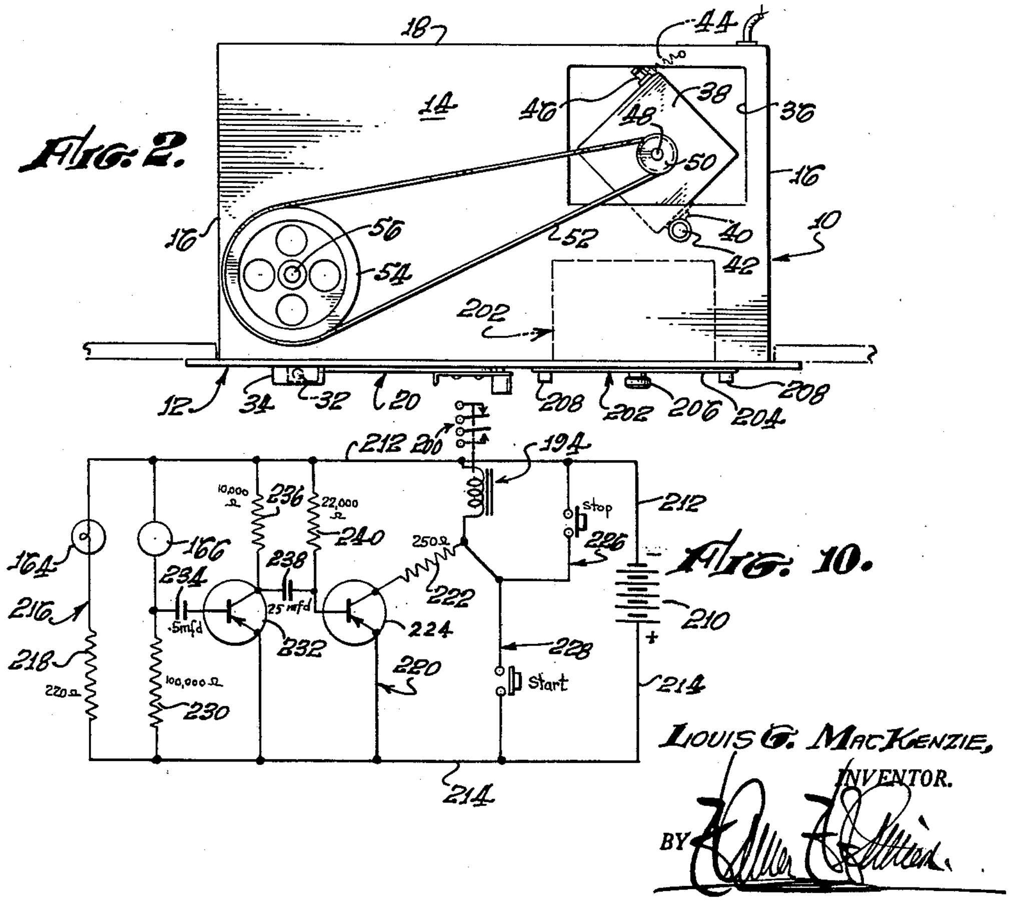
FIGURE 2 is a top plan view of my preferred embodiment shown in FIGURE 1.
FIGURE 10 is a schematic diagram of an electrical circuit which may be employed in connection with each of the tape cartridge actuating units in my present invention.

Referring to my drawings, and at first particularly to FIGURES 1 and 2 thereof, I have there illustrated a presently preferred construction in which five of my endless tape cartridge actuating units are vertically stacked in such a manner that the tape of each unit may be selectively operatively engaged with a common driving shaft or capstan.

I provide a suitable housing 10 having a front panel 12, a top panel 14, side walls 16 and a rear wall 18.

Each of the tape cartridge supporting units comprises a hinged tray or gate, the five hinged trays or gates 20, 22, 24, 26 and 28 being vertically stacked as best shown in FIGURE 1.

Each of the trays includes a hinge member 30 at one side, the hinge members 30 being mounted on a common vertical hinge shaft 32 which is in turn mounted between a pair of vertically spaced bosses 34 projecting outwardly from the front panel 12. Suitable adjustable support collars 33 are mounted on hinge shaft 32 to provide the proper vertical positioning of the individual trays.

I provide a window 36 in top panel 14 within which is mounted drive motor 38. Motor 38 has a suitable mounting bracket 40 on its casing, bracket 40 being hingedly connected to the housing 10 by means of a suitable vertical pivot pin 42. A tension spring 44 engages housing 10 and an ear 46 projecting from motor 38, to urge motor 38 in a clockwise direction about pin 42.

The vertically disposed motor shaft 48 projects upwardly through window 36 and is provided with drive pulley 50 above top panel 14. Pulley 50 drives belt 52, which in turn actuates driven pulley 54 which is operatively connected to the top of a capstan or vertical shaft 56 which drives the tapes on all of the hinged trays 20, 22, 24, 26 and 28, in the manner hereinafter described.

Figures 3, 11, 12:
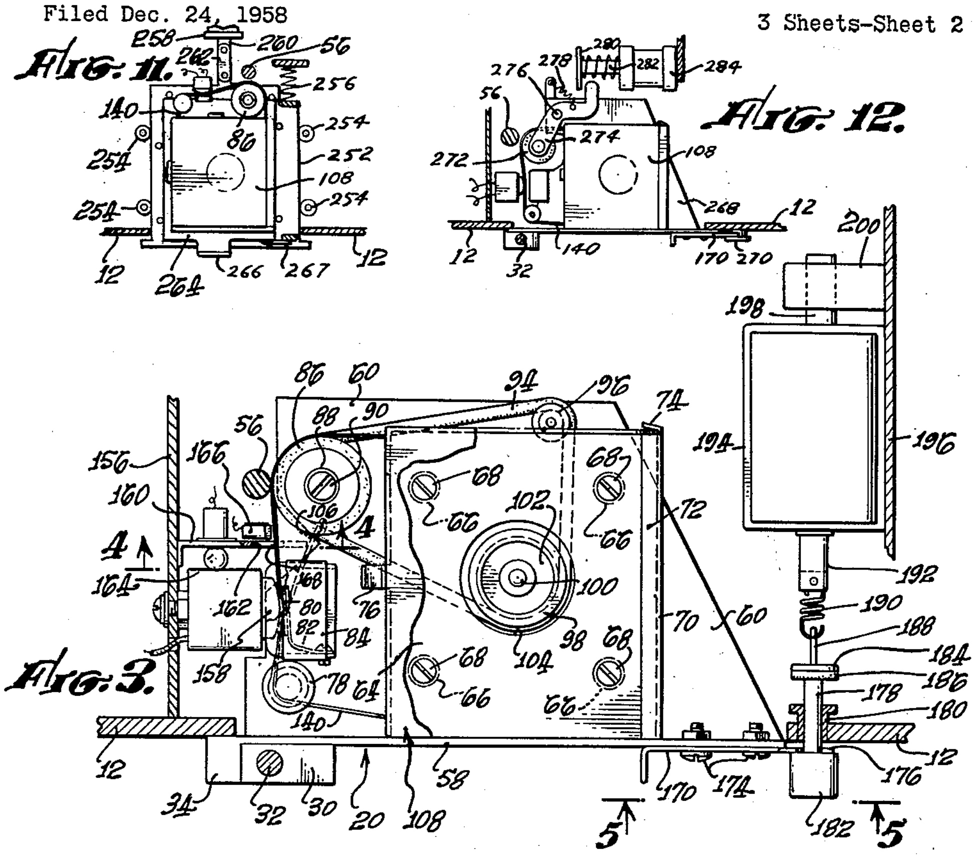
FIGURE 3 is a horizontal section along the line 3—3 in FIGURE 1, illustrating a presently preferred embodiment of my actuating mechanism for actuating a single endless tape cartridge, the unit illustrated in FIGURE 3 comprising one of five such substantially identical units which are disposed in vertically stacked relation in FIGURE 1.
FIGURE 11 is a top plan view illustrating an alternative embodiment of my tray or gate in which the tray or gate is slideably moved into and out of the tape actuating position instead of being hingedly moved as in the preferred embodiment best shown in FIGURES 1, 3 and 6.
FIGURE 12 is a second alternative embodiment of my tray or gate in which the tray remains stationary during normal operation of the mechanism, with the tape actuating roller being selectively movable to move the tape into and out of mechanical engagement with a rotating drive shaft.
Figure 4:
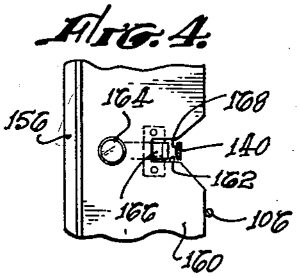
FIGURE 4 is a fractional vertical section along the line 4—4 in FIGURE 3, illustrating the construction of my presently preferred cueing means.
Figures 6, 7, 8, 9:
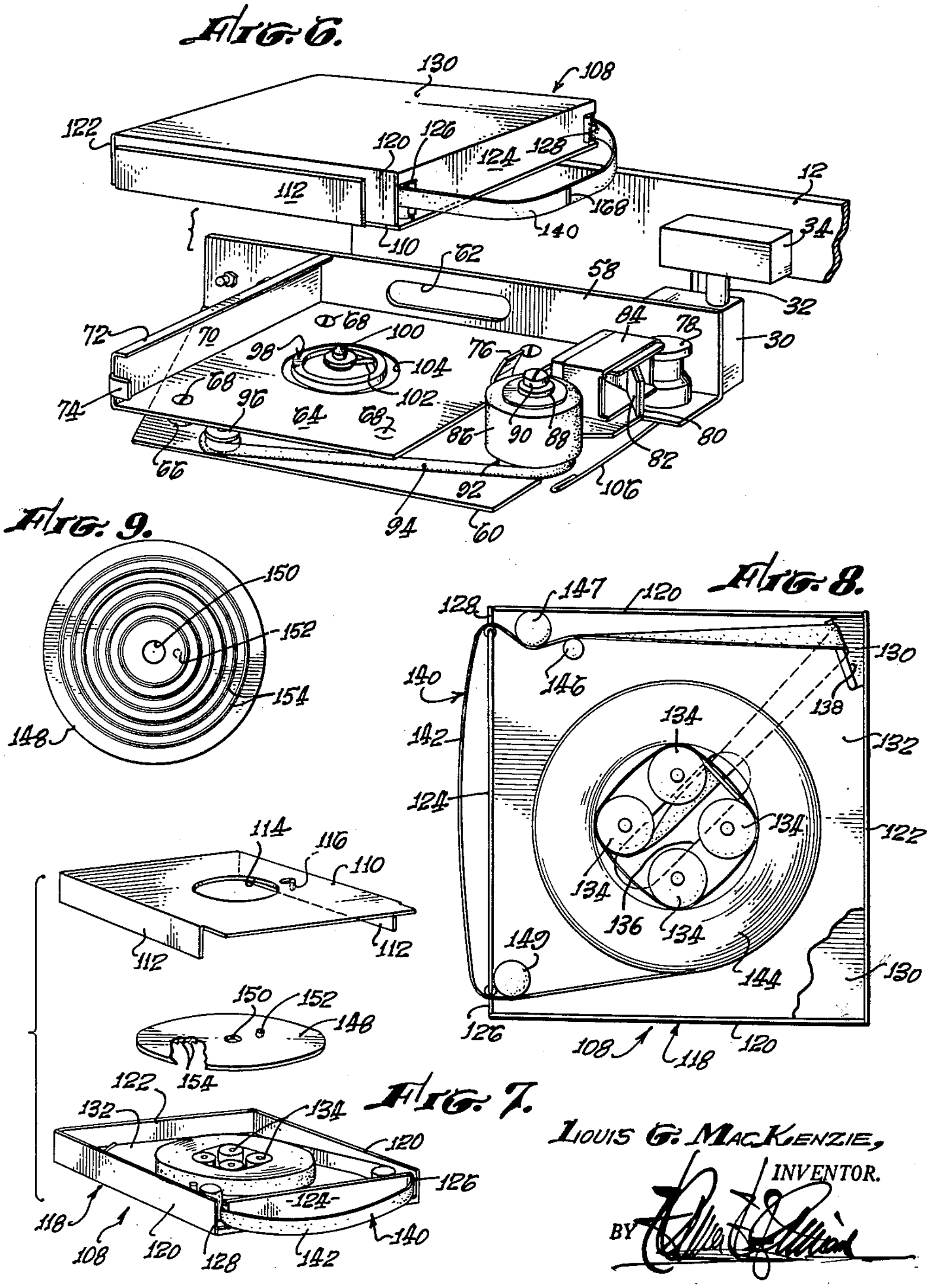
FIGURE 6 is an exploded perspective view showing the details of construction of my presently preferred hinged tray or gate also shown in FIGURES 3 and 5, with an endless tape cartridge provided in accordance with my prior Patent No. 2,699,332, spaced upwardly from the tray so that the structural details of the tray are visible.
FIGURE 7 is an exploded perspective view of the cartridge shown in FIGURE 6, inverted for convenience in showing the internal details of construction thereof.
FIGURE 8 is a bottom plan view of the top portion of the cartridge shown in FIGURE 6, illustrating the details of construction thereof.
FIGURE 9 is a top plan view of the turntable portion of the cartridge.

Referring now particularly to FIGURES 3 and 6, I have there illustrated a presently preferred construction of one of my hinged trays for supporting an endless tape cartridge of the type set forth in my prior United States Letters Patent No. 2,699,332.

The tray 20 is provided with a vertical front plate 58 and a horizontal base plate 60, which may merely comprise a continuation of the front plate 58 which is bent back at the bottom of plate 58. I provide a horizontally elongated window 62 in front plate 58 for viewing an identifying label or the like on the tape cartridge which is supported on tray 20.

A horizontal table or shelf 64 is spaced upwardly from base plate 60 by means of suitable spacers 66, and is affixed in this position by suitable screws 68. The construction of the table or shelf 64 is best shown in FIGURE 6 in which the tray 20 has been moved outwardly about hinge shaft 32 through approximately 180°.

At the left side of table or shelf 64 as pictured in FIGURE 6, I provide a vertical side wall 70 having a horizontal flange 72 along its upper edge. Side wall 70 may merely comprise an extension of the table or shelf 64, bent upwardly therefrom. An ear 74 is provided at the inner edge of side wall 70. I provide an upwardly extending aligning tab 76 along the other side edge of table or shelf 64. My generally flat, rectangular continuous tape cartridge is easily slipped into and out of its operative position on table 64 by merely slipping one edge under flange 72 against side wall 70, with the opposite edge sliding down into position against the tab 76. The front edge of the cartridge will rest against front plate 58, and the rear edge will be held in position by the ear 74. With the continuous tape cartridge in this position, a loop of the tape will project outwardly from the right-hand edge of the cartridge as shown in FIGURE 6.

The base plate 60 extends outwardly substantially beyond the right-hand edge of table 64 in FIGURE 6 (extending to the left of table 64 in FIGURE 3). Mounted on this portion of base plate 60 is a notched guide post 78 for guiding the tape as it comes out of the cartridge. After leaving guide post 78 the tape is then engaged by a pressure pad 80 of felt or other soft material which is resiliently mounted on a suitable leaf spring 82, which may be composed of any suitable material, such as beryllium copper. The spring 82 is mounted in a small housing 84 which also serves as a magnetic head shield against extraneous magnetic disturbances.

After the tape leaves the pad 80 it then passes over a roller 86 having a resilient surface composed of rubber or other suitable material. The roller 86 includes a vertically oriented axial bushing 88 that is rotatably mounted on a fixed shaft 90 attached to the base plate 60.

Roller 86 is provided with an integral pulley 92 which drives a belt 94 of rubber or other suitable material. Belt 94 passes over an idler roller 96 mounted on base plate 60 under the inner edge of table 64, the belt 94 being in driving engagement with turntable drive member 98 which is rotatably mounted on a vertical axis on base plate 60.

The turntable drive member 98 is provided with an axial centering pin 100 and a radially oriented horizontal drive pin 102. The turntable drive member 98 is exposed through a central opening 104 in the table 64.

I provide a small wire spring 106 which is integrally fastened to the hinged tray 20, and which operatively engages a portion of the housing 10 in the manner hereinafter described to normally urge the hinged tray 20 outwardly to a position in which the tape carried by tray 20 is unactuated.

My presently preferred endless tape cartridge, which is set forth in my prior United States Letters Patent No. 2,699,332, is shown in some detail in FIGURES 6, 7, 8 and 9. The tape cartridge 108 includes a base plate 110 having side flanges 112, and a central opening 114. An upwardly extending guide pin 116 is provided between opening 114 and one of the side flanges 112.

The cartridge housing member 118 is provided with opposed side walls 120, rear wall 122 and front wall 124. Front wall 124 has tape inlet and outlet slots 126 and 128, respectively, at its ends. The housing member 118 also includes a top wall 130, the front and rear walls of housing 118 preferably merely comprising extensions of the top wall 130 which are bent downwardly therefrom.

I provide a mounting plate 132 within the housing member 118 and spaced downwardly from top wall 130. A plurality of circularly arranged rollers 134, composed of nylon or other suitable material, are mounted on mounting plate 132, extending downwardly therefrom. A central feed opening 136 is provided in mounting plate 132 between the rollers 134, the tape moving over the outside of the rollers 134 and around one of the rollers 134, and then curving upwardly through the central feed opening 136 and between top wall 130 and mounting plate 132, and thence downwardly out of opening 138 through an outer corner of mounting plate 132, and thence out of the cartridge through outlet slot 128.

The tape 140 is continuous, forming a loop 142 outside of cartridge 108 between the outlet and inlet slots 126 and 128, respectively. The tape 140 which enters the cartridge 108 through inlet slot 126 feeds onto the outside of tape roll 144, which is rotatable about the rollers 134.

A guide post 146, and lubricating posts 147 and 149 of graphite or other suitable lubricating material, are provided to give the tape a continuous lubrication.

The tape roll 144 rests on a turntable 148 which has a central guide opening 150 engaged by the upwardly extending centering pin 100, which forms a part of the turntable drive member 98. A small drive pin 152 depends from turntable 148 and is operatively engaged by the horizontal drive pin 102 on turntable drive member 98. The turntable 148 has a plurality of annularly arranged projections 154 on its upper surface which function to continuously separate the turns of the tape roll 144 during rotation of the tape roll 144 in operation, to prevent binding of the tape.

Having fully described the construction of a presently preferred embodiment of my movable tray or gate, and a continuous tape cartridge adapted to be supported thereon, I will now describe my presently preferred apparatus which is mounted in the housing 10 for actuating the movable tray and the recording tape supported thereon.

Referring now particularly to FIGURE 3 of the drawings, I provide a fixed vertical mounting plate 156 within housing 10. A conventional playback or recording magnetic head 158 is mounted on plate 156, and the tape 140 is held tightly against head 158 by pressure pad 80 when the hinged tray 20 is in its completely closed position as shown in FIGURE 3 for actuating the tape 140, or when it is in its slightly open position, with the tape unactuated in the manner hereinafter described.

A vertical mounting flange 160 extends to the right of plate 156 in FIGURE 3, and is provided with a slot 162 in its exposed edge. A continuously operating light 164 is mounted on one side of flange 160, and a small photocell 166 is mounted on the other side of flange 160.

I provide a small segment of a reflective coating 168 on tape 140, this reflective coating being of any suitable material, such as a thin strip of bright metal, a strip of metallic paint, or other suitable coating.

The tape 140 passes along the outer edge of slot 162 in mounting flange 160, and when the reflective coating 168 reaches slot 162, light from the source 164 will be reflected from coating 168, the light passing through the slot 162 and being received by photocell 166 for stopping the tape 140 in the manner hereinafter set forth, or for accomplishing some other function. The region proximate slot 162 and recording magnetic head 158 comprises an operating zone, this being the zone through which the tape passes for the purpose of imparting light impulses to photocell 166 and electromagnetic impulses to recording head 158.

Figures 5, 14:
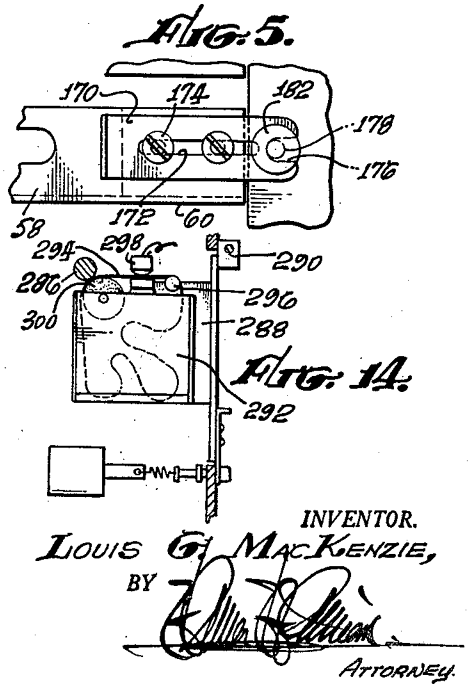
FIGURE 5 is a fractional front elevation view taken on the line 5—5 in FIGURE 3 illustrating my presently preferred latch construction for one of my hinged trays or gates which support the individual endless tape cartridges.
FIGURE 14 is a side elevation view illustrating an alternative embodiment of my invention in which the driving shaft is horizontally disposed, with the cartridge supporting tray or gate being hinged about a horizontal axis to move the tape into and out of engagement with the shaft.

A horizontally sliding bar 170, best shown in FIGURES 3 and 5, is provided with a horizontal slot 172 through which a pair of spaced bolts 174 pass to provide a sliding mounting for the bar 170 on the front plate 58 of the tray at the side opposite the hinge. The right-hand end of bar 170 is provided with a recess 176 which engages over a horizontal latch shaft 178 that is slideable in a bushing 180 mounted through the front housing 12 adjacent to the tray 20. A knob 182 is mounted on the outer end of shaft 178, knob 182 operatively engaging the sliding bar 170 when the bar 170 is in its right-hand position as shown in FIGURES 3 and 5. The bar 170 is thus engaged by knob 182 for operation of the tray. However, whenever it is desired to swing the tray 20 clockwise about hinge shaft 32 in FIGURE 3 for replacing continuous tape cartridge 108, all that is required is to slide the bar 170 to the left out of engagement with knob 182, and swing the tray 20 clockwise to a position such as that shown in FIGURE 6 of the drawings.

A stop member 184 is provided at the inner end of the sliding shaft 178 to limit the amount of outward movement of the shaft 178 and knob 182, and to correspondingly limit the amount of travel of the tray 20 about hinge shaft 32 during normal operation of the apparatus.

Stop member 184 is provided with suitable outwardly facing padding 186, and has an eye member 188 extending inwardly therefrom to receive one end of a spring 190, the other end of which is attached to the end of shaft 192 of a solenoid 194.

Solenoid 194 is mounted on a suitable mounting plate 196 forming an integral part of housing 10.

I provide an extension 198 of solenoid shaft 192 which extends to the rear of solenoid 194 into operative engagement with a contact unit 200 mounted on plate 196 for making and breaking suitable electrical contacts for purposes hereinafter described.

In my presently preferred apparatus shown in FIGURE 1 I provide separate pre-amplifier units 202 for the respective trays 20, 22, 24, 26 and 28. These pre-amplifier units 202 are of conventional design, preferably of the plug-in type which is removable and replaceable for servicing. Accordingly, each of the pre-amplifier units 202 is constructed as a drawer, including a front plate 204 with a central knob 206 thereon, and suitable locking screws 208 at the edges of the plate 204.

In FIGURE 10 of the drawings I have illustrated a suitable electrical circuit for the presently preferred embodiment of my invention shown and described herein. It is to be understood, however, that the schematic diagram of FIGURE 10 is merely representative, and that it may be varied in many ways to adapt my present invention for various purposes.

Any suitable source 210 of direct current may be provided, with negative and positive lines 212 and 214, respectively, attached thereto.

A lamp circuit 216 is operatively connected between negative and positive lines 212 and 214, respectively, the lamp circuit including light 164 and a suitable resistor 218 in series.

I provide a holding circuit 220 which is coupled in series with the solenoid 194 to hold the solenoid 194 in its actuated position as shown in FIGURE 3 of the drawings once the solenoid has been actuated as hereinafter described. This holding circuit 220 takes advantage of the characteristic of most solenoids that less electrical current is required to hold the solenoid in the actuated position once it has been actuated than is required for the initial actuation. Accordingly, my holding circuit 220 is normally drawing current in both the unactuated and actuated positions of solenoid 194, the current passing through holding circuit 220 and solenoid 194 not being sufficient to actuate the solenoid 194 initially, but being sufficient to hold the solenoid in the actuated position once it has been provided with sufficient additional current to actuate it.

Holding circuit 220 includes a resistor 222 and a transistor 224 which are in series with the solenoid 194 between the negative line 212 and the positive line 214.

I provide a stop circuit 226, which may be either manually or automatically operated, the stop circuit 226 operatively engaging the negative line 212 and the positive side of the solenoid 194. Stop circuit 226 is normally open, but is selectively closeable to short circuit the solenoid 194 so that the solenoid is released from its actuated position of FIGURE 3. Upon this release of solenoid 194, the tray or gate 20 will swing slightly outwardly to its inoperative position.

Once the solenoid 194 has thus been released, the current through holding circuit 220 is not sufficient to again actuate the solenoid.

I provide a start circuit 228, which may be automatically or manually operated, to provide the necessary additional current to solenoid 194 to actuate the solenoid 194. Start circuit 228 merely comprises a selectively closeable electrical connection between positive line 214 and solenoid 194 to place the solenoid directly between the positive and negative lines 214 and 212, respectively. Once the solenoid 194 has thus been actuated, release of the start circuit 228 will leave the holding circuit 220 in operation, to hold the solenoid in its operative position until again released as heretofore set forth.

In the presently preferred embodiment of my invention, the photocell 166 is operatively associated with the holding circuit 220 in such a manner that when the reflective coating 168 on the tape causes light to be reflected into the photocell 166, the current in holding circuit 220 will be reduced to a point where the solenoid 194 will release the gate or tray 20. This is accompanied by operatively connecting the photocell 166 and a suitable resistor 230 in series between the negative line 212 and positive line 214, the positive side of the photocell 166 being connected to the input of a current amplifier transistor 232 through a suitable input condenser 234. The transistor 232 is connected in series with a suitable resistor 236 between the positive line 214 and the negative line 212. The output of transistor 232 is operatively connected to the input of transistor 224 through an input condenser 238, with the input of transistor 224 being suitably bled to the negative line 212 through resistor 240.

Light impinging upon photocell 166 will provide electrical current through resistor 230, which will reduce the electrical potential at the input of transistor 232, this signal being amplified by transistor 232 and applied to transistor 224 to block the current through transistor 224, and hence to release the solenoid 194.

Having fully described the construction of the presently preferred embodiment of my invention, I will now describe the preferred manner in which it operates.

All of the trays or gates 20, 22, 24, 26 and 28 are normally in their unactuated positions hinged slightly outwardly from the closed position shown in FIGURE 3, with the latching shafts 178 in their outermost positions and stop members 184 against bushings 180. Knob 182 engages slide bar 170 to hold each of the trays or gates in this position.

Since all of the trays or gates have the same construction and operation, the operation will be described in detail in connection with tray or gate 20.

The small wire spring 106 abuts against mounting flange 160 to urge the tray 20 outwardly in the unactuated position. In this position of the tray, the resilient roller 86 will be spaced to the right of capstan 56 in FIGURE 3, so that capstan 56 will not be in driving engagement with the resilient roller 86 and the tape 140. Although the magnetic head 158 may be energized at this time, since the tape 140 is not moving across head 158, there will not be any playback from tape 140 or recording on the tape through head 158 at this time. In this unactuated position of tray 20, one of the contacts in contact unit 200 associated with solenoid 194 may be made to short circuit the pre-amplifier associated with tray 20, so that unwanted signals will not be released from that unit to interfere with signals being played back from one or more other units.

Upon actuation of the start circuit 228 to energize solenoid 194, the solenoid shaft 192 will move inwardly to move the latch shaft 178 and knob 182 inwardly. This instantaneously closes the gate or tray 20 to the position shown in FIGURE 3, with the resilient roller 86 and the tape 140 carried thereby compressing against the continuously rotating capstan 56 (which rotates anticlockwise in FIGURE 3). The surface speed of capstan 56 is the desired normal operating speed of the tape (for example, 7½ inches per second), and accordingly the tape 140 is instantaneously accelerated from its rest position to its normal operating speed.

The surface of roller 86 is preferably substantially wider than the tape, whereby a substantial portion of roller 86 is directly engageable with the surface of the rotating capstan 56 to directly drive the roller.

The resilient roller 86 will drive belt 94 to drive the turntable 148 in cartridge 108.

Since the motor 38 and its drive train, including the capstan 56, are continuously functioning, and only slight shifting of the tray is required to actuate tape 14, the time interval between the impressing of the actuating signal upon the solenoid 194 and the normal output of information from tape 140 through head 158 or recording of information from head 158 onto tape 140 is inconsequential. The inertia of the tape itself and of the resilient roller 86 and its mechanically coupled parts is very small and does not have any substantial delaying effect.

The tape 140 will continue to pass over head 158 in this manner until the solenoid 194 is released by actuation of the stop circuit 226, either manually, or automatically by some remote actuating mechanism, or by the reflective coating 168 passing through the slot 162 to energize photocell 166. This release of solenoid 194 instantaneously releases the holding force on the latch shaft 178 and knob 182, whereby the resilient compression of roller 86 against capstan 56 will bounce the tray out to its inoperative position.

Even though the tray 20 is thus instantaneously bounced outwardly to its inoperative position, the pressure pad 80 still firmly holds the tape 140 against the head 158. This relatively tight frictional engagement between the pressure pad and head and the tape causes the instantaneous stopping of the tape upon release of the solenoid 194. In fact, with the pressure pad leaf spring 82 oriented in the position shown in FIGURES 3 and 6, leaf spring 82 being affixed to the small housing 34 on the leading side of the area of contact between pressure pad 80 and tape, 140, the pressure pad will impart a slight backward movement to the tape upon the outward swinging of tray 20, which will completely counteract will forward movement of the tape which would otherwise be caused by the small amount of inertia associated with the tape.

This instantaneous starting and stopping of the tape is of vital importance in most uses of continuous tape cartridges, and is particularly important where a plurality of the cartridges are operated simultaneously or successively to synthesize messages.

Although I have shown my reflective coating and associated light and photocell means for cueing the stopping of the tape, it will apparent that any other cueing means may be provided, such as a particular signal or absense of signal on the tape. Also, my photocell and reflective coating cueing means may be used for other purposes than stopping the tape, such as for the purpose of cueing in another one of the tape cartridges to be either combined with the one that is playing, or to succeed the one that is playing, for synthesizing information. Similarly, my reflective coating and photocell and light cueing means may be used to trip separate visual displays or other devices associated with the information on the tape.

While the tray or gate 20 is in its operative position as shown in FIGURE 3, the contact unit 200 associated with the solenoid shaft extension 198 will be so actuated that the pre-amplifier associated with tray 20 will not be short circuited, and will properly amplify with pass on the information received from tape 140 by head 158. Similarly, if desired, contacts may be provided in contact unit 200 so that when the tape is actuated as in FIGURE 3, a remote indicating device, such as a lamp, an annunciator, or the like, will be actuated to show that the unit is operating. Such contacts would again be opened upon release of the solenoid 194 to stop the unit. It will be apparent that any number of contacts may be provided in the contact unit 200 for coupling any desired external action with actuation or release of the solenoid.

Although I have disclosed solenoid means for actuating the continuous tape cartridges, it will be apparent that other means can be used, such as hydraulic, pneumatic, mechanical or other suitable means not shown herein. If such other actuating means were used to move the tape into the operative position, this other actuating means could be de-actuated by a solenoid associated with photocell 166, if desired.

Figure 13:
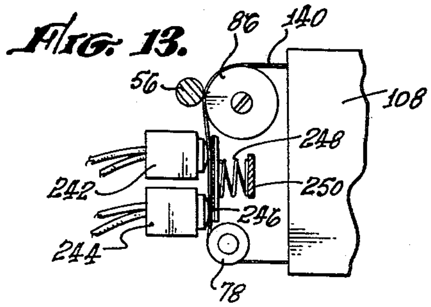
FIGURE 13 is a top plan view illustrating a plurality of magnetic heads in operative engagement with the tape of a single tape cartridge that is supported in my present invention.

Referring now to FIGURE 13 of the drawing, I have there illustrated the use of a plurality of magnetic heads, such as a record and playback head 242, and an erase head 244. Although separate pressure pads like the pad 80 heretofore described may be used, I have illustrated a single pressure pad 246 which holds the tape against both of the heads 242 and 244, pad 246 being backed up by a suitable compression spring 248 mounted on a mounting member 250. It will be apparent that any desired number of magnetic heads may be associated with the tape in my present invention.

Referring now to FIGURE 11 of the drawings, I have there illustrated an alternative embodiment of my invention in which the tray 252 in slideable into and out of its operative positions instead of being hingedly mounted as in the preferred embodiment of my invention. The tray 252 may be slideably mounted between a plurality of rollers 254, being normally held in its outer, inoperative position by means of a compression spring 256. The tray 252 is selectively moved from this outer position to its inner, operative position, by actuation of solenoid 258, the shaft 260 of which is operatively connected to tray 252 by a suitable link 262.

A removable holder 264, having a forwardly projecting handle 266 thereon, is mounted on the slideable tray 252, and may be completely removed from the tray 252 by disengaging latch 267 in order to remove and replace the continuous tape cartridge 108 thereon. The cartridge 108 will be seated on the removable holder 264 in substantially the same manner as the cartridge was seated on the tray in the preferred embodiment of my invention, and the removable holder will support the resilient roller 86 and the other tape guide structures shown and described in detail in connection with the hinged tray 20.

In this sliding embodiment of my tray or gate shown in FIGURE 11, the resilient roller 86 and the tape carried thereby are moved rearwardly into compressive engagement against the capstan 56 to operate the tape, and moved forwardly out of engagement with the capstan 56 to stop the tape.

Referring now to FIGURE 12 of the drawings, I have there illustrated a second alternative embodiment of my invention in which the tray 268 is hinged on shaft 32 in much the same manner as the tray 20 in the preferred embodiment, but with the tray normally being fully closed with the sliding latch engaging a fixed latch button 270 on the panel 12. The tray 268 will will only be hinged outwardly for removal and replacement of the cartridge 108 thereon.

In the construction shown in FIGURE 12, the tape 140 from cartridge 108 passes over a resilient roller 272 like roller 86 in the preferred embodiment, this roller 272 being rotatably supported on a lever arm 274 that is pivotally mounted on the tray 268 by a suitable pin 276. The roller 272 is normally held out of operative engagement with capstan 56 by means of a tension spring 278.

A lug or flange 280 on the shaft 282 of solenoid 284 engages the lever arm 274 upon actuation of solenoid 284 to move roller 272 and the tape 140 into operative engagement with capstan 56.

It will be apparent that the embodiment of my invention shown in FIGURE 12 involves less inertia in moving the tape into and out of operative engagement with the capstan 56 by moving only the roller and not the entire tray and cartridge, for the quickest possible starting and stopping of the tape.

In FIGURE 14 of the drawings I have illustrated still another embodiment of my invention in which a horizontal capstan 286 is provided. The gate or tray 288 is hingedly mounted on a horizontal hinge pin 290, and is provided with latch and solenoid actuating means substantially the same as those shown in the preferred embodiment of my invention.

In FIGURE 14 I have shown a simple type of continuous tape cartridge 292 in which the tape 294 is merely stacked at random in the cartridge 292, with the cartridge 292 acting as a simple receptacle. The tape 294 passes over a suitable guide post 296, and past the magnetic head 298, the tape passing over a resilient roller 300 which is compressed with the tape against the horizontal capstan or shaft 286 when the solenoid is actuated to close the gate or tray 288.

It will be noted in the embodiment of FIGURE 14 that I have shown the resilient roller 300 as being rotatably mounted within the cartridge itself, with a portion of the roller 300 projecting out of the edge of the cartridge. It will be apparent that such a construction could be used in connection with any continuous tape cartridge, and could be used in connection with the preferred tray and cartridge construction heretofore described with relatively little modification and with substantially the same mode of operation.

A presently preferred use of my invention is to feed recorded sounds, such as messages, music, audio program material, or the like, to the audio circuitry of speaker systems, radio and television studios for further transmission, or the like.

Several examples of uses for my present invention, which are not intended to be in any way limiting as to either the uses or the detailed construction of my invention required for the various uses, are as follows:

(1) My invention may be used for re-creating the sounds of a baseball game in a radio or television studio as follows: A first continuous tape unit mounted on one of the gates or trays may have recorded thereon the general noisy atmosphere of a baseball stadium. This first tape may be playing continuously to provide this background. A second tape, mounted on a second one of my gates or trays, may be selectively manually actuated, by a suitable button, to play back a recorded sound of the crack of a bat against a baseball, and the medium roar of the crowd. A third tape unit may contain the recorded sound of the crack of the bat against the ball, together with a large roar from the crowd to indicate a home run, this third tape, like the second tape, being selectively manually operable by a button or the like to fit in with whatever the radio or television station announcer is talking about. This can create a very realistic atmosphere for the announcer's presentation.

(2) A second example of the use of my present invention is in a television production. A first tape would provide outdoor background noises. A second tape would have recorded thereon the sounds of horses' hooves. A third tape would carry recorded pistol shot sounds. A fourth tape would carry recorded sounds of a woman screaming. A fifth tape might carry suitable background music. It will be apparent that any number of such tapes may be used, according to the requirements. The studio operator may then start and stop, and combine, the outputs of these tapes in such a manner as to produce a wide variety of very realistic program effects. If desired, a sixth tape could carry the applause of an audience purportedly watching the program.

(3) Another example is the recording of a plurality of different types of laughs on the respective tapes. For example, five different types of laughs may be recorded on five separate tape units, these laughs being fed together simultaneously or successively to provide several dozen overall types of laughs.

It will be apparent that my tape cartridge units can be actuated by any desired means, including but not limited to manual actuation of the cartridges, operation of the cartridges by a time clock, the successive actuation of a plurality of my cartridges by each other, or by other means.

I have found that my present invention is ideal for synthesizing messages where a large number of messages will have many common parts. For example, in announcing the arrival and departure of aircraft at an airport, many of the messages will have such things in common as the airline name, the departure and arrival gates, the departure and arrival times, and the like. Accordingly, by having each common statement recorded on a separate cartridge, relatively few such cartridges may be used to announce a very large number of messages, with the cartridges being successively played in various orders to synthesize these messages. Such synthesizing can be accomplished either manually or by suitable automatic means that may be triggered manually or by a time clock or otherwise.

It will also be apparent that my present invention will be useful in the controlled storage and release of information in connection with computer.

Although I have described my present invention in detail in connection with endless tape cartridges containing magnetic recording tapes, it is to be understood that my present invention may be employed in connection with other types of endless tapes, such as film tapes, grooved tapes adapted to receive a phonograph record type of recording and others.

It is to be understood that the form of my invention herein shown and described is my preferred embodiment and that various changes in the shape, size and arrangement of parts may be resorted to without departing from the spirit of my invention, or the scope of my appended claims.

I claim:

1. In apparatus for actuating an endless tape cartridge, the combination comprising; a housing; a continuously rotating annular drive member mounted in said housing; a magnetic head mounted in said housing; hinge means mounted on said housing; a movable support mounted on said hinge means for movement relative to said housing; said movable support supporting said endless tape cartridge and having an idler roller mounted thereon, the tape of said tape cartridge engaging said idler roller; said movable support being movable from a first position at least partially without said housing to a second position within said housing; said idler roller and tape being out of engagement with said drive member when said support is in said first position, said idler roller causing said tape to operatively engage said drive member when said support is in said second position whereby said tape is driven past said magnetic head; and electromagnetic means coupled to said support and operable to move said support from said first position to said second position.

2. The apparatus of claim 1 wherein a spring loaded pad is mounted on said support, said pad frictionally engaging said tape and causing said tape to engage said head in either support position whereby movement of said tape will cease instantaneously upon movement of said support from said second position to said first position, and wherein means are provided for biasing said support in said first position.

3. The apparatus of claim 2 wherein said electromagnetic means is a solenoid and wherein said solenoid is actuated by an electrical circuit including a source of electrical power, operative connections between said source of power and said solenoid to normally provide a holding current through said solenoid sufficient to hold the solenoid in its actuated position in which the support is in said second position but insufficient to actuate the solenoid initially, a start circuit operatively connecting said solenoid and said power source to provide sufficient electrical current to said solenoid to initially actuate the solenoid, and a stop circuit operatively connected to the solenoid to block off the holding current from the solenoid whereby said support can return to said first position.

4. In apparatus for actuating a plurality of endless tape cartridges, the combination comprising; a housing; a continuously rotating drive shaft mounted in said housing; a plurality of magnetic heads mounted in said housing; a plurality of hinge means mounted on said housing; a plurality of movable supports mounted on said hinge means for movement relative to said housing; each of said movable supports supporting one of said plurality of tape cartridges and having an idler roller mounted thereon, the tape of said tape cartridge engaging said idler roller; each of said movable supports being movable from a first position at least partially without said housing to a second position within said housing; the idler roller and tape carried by each of said supports being out of engagement with said drive shaft when the support is in said first position; each idler roller causing its associated tape to operatively engage said drive shaft when its respective support is in said second position whereby said tape is driven past a corresponding one of said magnetic heads; and a plurality of electromagnetic means, at least one of said electromagnetic means being coupled to each of said movable supports and being operable to move said support from said first position to said second position.

References Cited in the file of this patent

UNITED STATES PATENTS

| | | |
|---|---|---|
| 1,873,057 | Smith | Aug. 23, 1932 |
| 2,129,847 | Knodel | Sept. 13, 1938 |
| 2,160,083 | Peterson | May 30, 1939 |
| 2,486,334 | Slamar | Oct. 25, 1949 |
| 2,669,332 | MacKenzie | Jan. 11, 1955 |
| 2,768,827 | Noble | Oct. 30, 1956 |
| 2,778,637 | Eash | Jan. 22, 1957 |
| 2,778,880 | Eash | Jan. 22, 1957 |
| 2,788,209 | Montijo | Apr. 9, 1957 |
| 2,821,576 | Gaubert | Jan. 28, 1958 |
| 2,840,721 | Frommer | June 24, 1958 |
| 2,844,369 | Singer | July 22, 1958 |
| 2,864,611 | Gray | Dec. 16, 1958 |
| 2,867,435 | Gleason | Jan. 6, 1959 |
| 2,951,914 | Dubois | Sept. 6, 1960 |
| 3,009,024 | Eash | Nov. 14, 1961 |
| 3,027,112 | Flan | Mar. 27, 1962 |